United States Patent
Angaluri et al.

(10) Patent No.: US 10,819,607 B2
(45) Date of Patent: Oct. 27, 2020

(54) REDUCING POWER CONSUMPTION OF A COMPUTE NODE EXPERIENCING A BOTTLENECK

(71) Applicant: Lenovo Enterprise Solutions (Singapore) Pte. Ltd., Singapore (SG)

(72) Inventors: Srihari V. Angaluri, Raleigh, NC (US); Gary D. Cudak, Wake Forest, NC (US); Ajay Dholakia, Cary, NC (US); Chulho Kim, Poughkeepsie, NY (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 648 days.

(21) Appl. No.: 14/964,007

(22) Filed: Dec. 9, 2015

(65) Prior Publication Data

US 2017/0168540 A1    Jun. 15, 2017

(51) Int. Cl.
*H04L 12/26* (2006.01)
*G06F 1/20* (2006.01)
(Continued)

(52) U.S. Cl.
CPC ......... *H04L 43/0882* (2013.01); *G06F 1/206* (2013.01); *G06F 1/3215* (2013.01); *G06F 1/3228* (2013.01); *G06F 9/4893* (2013.01); *G06F 9/505* (2013.01); *G06F 9/5077* (2013.01); *H04L 43/0817* (2013.01); *H04L 43/16* (2013.01); *G06F 2209/504* (2013.01); *G06F 2209/508* (2013.01); *G06F 2209/5019* (2013.01); *G06F 2209/5022* (2013.01);
(Continued)

(58) Field of Classification Search
CPC ...... G06F 1/324; G06F 1/3209; G06F 9/5083; G06F 1/206; G06F 1/3228; G06F 1/3215; G06F 9/5077; G06F 9/505; G06F 9/4893; G06F 2209/5019; G06F 2209/508; G06F 2209/5022; G06F 2209/504; H04L 43/0882; H04L 43/0817; H04L 43/16; Y02D 10/16; Y02D 10/24; Y02D 10/22; Y02D 10/36
See application file for complete search history.

(56) References Cited

U.S. PATENT DOCUMENTS 6,895,520 B1 * 5/2005 Altmejd ............... G06F 1/3203
   713/324
7,069,463 B2 * 6/2006 Oh ..................... G06F 1/3203
   713/322

(Continued)

*Primary Examiner* — Thomas C Lee
*Assistant Examiner* — Anzuman Sharmin
(74) *Attorney, Agent, or Firm* — Jeffrey Streets (57) ABSTRACT

A method includes obtaining component utilization data for multiple components of a compute node during at least one previous execution of a workload. The method further includes using the component utilization data to identify a first component having a utilization level that is less than a threshold utilization level during the at least one previous execution of the workload, wherein the first component is one of the multiple components of the compute node. The method still further includes, during a subsequent execution of the workload on the compute node, throttling the first component to prevent the first component from exceeding the threshold utilization level.

18 Claims, 5 Drawing Sheets

(51) Int. Cl.
*G06F 1/3228* (2019.01)
*G06F 1/3215* (2019.01)
*G06F 9/50* (2006.01)
*G06F 9/48* (2006.01)

(52) U.S. Cl.
CPC .............. *Y02D 10/16* (2018.01); *Y02D 10/22* (2018.01); *Y02D 10/24* (2018.01); *Y02D 10/36* (2018.01)

(56) References Cited

U.S. PATENT DOCUMENTS

| | | | |
|---|---|---|---|
| 7,272,517 B1* | 9/2007 | Brey | G06F 11/3409 702/60 |
| 7,519,843 B1* | 4/2009 | Buterbaugh | G06F 1/30 713/322 |
| 7,529,949 B1* | 5/2009 | Ranganathan | G06F 1/263 713/300 |
| 2003/0229821 A1* | 12/2003 | Ma | G06F 1/3203 714/6.13 |
| 2007/0245161 A1* | 10/2007 | Shaw | G06F 1/3203 713/300 |
| 2007/0260897 A1* | 11/2007 | Cochran | G06F 1/263 713/300 |
| 2008/0086734 A1* | 4/2008 | Jensen | G06F 9/4881 718/104 |
| 2008/0228959 A1* | 9/2008 | Wang | G06F 1/206 710/22 |
| 2009/0006876 A1* | 1/2009 | Fukatani | G06F 3/0625 713/320 |
| 2009/0125737 A1* | 5/2009 | Brey | G06F 1/3203 713/322 |
| 2009/0217066 A1* | 8/2009 | Mani | G06F 1/3209 713/320 |
| 2010/0083010 A1* | 4/2010 | Kern | G06F 1/3203 713/300 |
| 2010/0250642 A1* | 9/2010 | Yellin | G06F 11/3409 709/201 |
| 2011/0099320 A1* | 4/2011 | Lucas | G06F 3/0616 711/103 |
| 2012/0041749 A1* | 2/2012 | Aarts | G06F 17/5009 703/21 |
| 2012/0060168 A1* | 3/2012 | Lee | G06F 9/4887 718/104 |
| 2013/0080641 A1* | 3/2013 | Lui | H04L 67/10 709/226 |
| 2013/0080809 A1* | 3/2013 | Lu | G06F 1/206 713/322 |
| 2013/0262953 A1* | 10/2013 | Deng | G06F 11/1004 714/752 |
| 2014/0149296 A1* | 5/2014 | Chang | G06Q 10/20 705/305 |
| 2014/0152278 A1* | 6/2014 | Shepard | H02M 3/1584 323/272 |
| 2014/0325524 A1* | 10/2014 | Zangaro | G06F 9/5083 718/105 |
| 2015/0229295 A1* | 8/2015 | Andry | H02M 1/08 327/109 |
| 2015/0286261 A1* | 10/2015 | Bose | G06F 1/324 713/322 |

* cited by examiner

Component Utilization History—Compute Node 1

| Workload ID | Processor (%) | Memory (%) | Data Storage (%) | Network Interface (%) |
|---|---|---|---|---|
| ABC | 100 | 50 | 15 | 30 |
| DEF | 40 | 100 | 30 | 10 |
| ABC | 100 | 40 | 10 | 25 |
| GHI | 60 | 55 | 40 | 100 |
| JKL | 100 | 80 | 50 | 5 |
| DEF | 45 | 100 | 35 | 15 |
| ABC | 100 | 45 | 15 | 30 |
| GHI | 65 | 50 | 40 | 100 |
| ABC | 100 | 50 | 10 | 20 |
| DEF | 50 | 100 | 40 | 10 |

FIG. 4

(Partial) Component Utilization History—Compute Node 1

| Workload ID | Processor (%) | Memory (%) | Data Storage (%) | Network Interface (%) |
|---|---|---|---|---|
| ABC | 100 | 50 | 15 | 30 |
| ABC | 100 | 40 | 10 | 25 |
| ABC | 100 | 45 | 15 | 30 |
| ABC | 100 | 50 | 10 | 20 |

(Partial) Component Utilization History—Compute Node 2

| Workload ID | Processor (%) | Memory (%) | Data Storage (%) | Network Interface (%) |
|---|---|---|---|---|
| ABC | 100 | 30 | 25 | 40 |
| ABC | 100 | 25 | 14 | 36 |
| ABC | 100 | 30 | 25 | 38 |
|  |  |  |  |  |

Node Configuration Summary

| Node ID | Processor Capacity (GHz) | Memory | | Data Storage | | Network Interface (Gbps) |
|---|---|---|---|---|---|---|
|  |  | Amt(GB) | Speed(MHz) | RPM | Cache(MB) |  |
| 1 | 2.00 | 512 | 100 | 7200 | 2.0 | 10 |
| 2 | 2.40 | 1024 | 133 | 5400 | 1.0 | 10 |
|  |  |  |  |  |  |  |

REDUCING POWER CONSUMPTION OF A COMPUTE NODE EXPERIENCING A BOTTLENECK

BACKGROUND

Field of the Invention

The present invention relates to power management within a compute node.

Background of the Related Art

Datacenters include large numbers of compute nodes in order to have the capacity to run large workloads or a large number of workloads, such as application programs. In order for the compute nodes and other supporting equipment to operate, the datacenter must provide a sufficient amount of electrical power and distribute that power to each of the compute nodes and other equipment. Some of the power consumed by the compute nodes produces heat, which requires a cooling system to prevent high temperatures from damaging various components of the compute nodes. The amount of electrical power consumed in order to operate the compute nodes may represent the greatest expense of owning and operating the datacenter.

Reducing power consumption and the associated expense is a high priority for a modern datacenter. Efforts to reduce datacenter power consumption may be directed at the cooling system design, network operations, energy efficient components, and the like. Some management applications may impose caps on a compute node or an individual component in order to force a compute node to consume no more than a given threshold of electrical power. However, such caps are likely to reduce the overall performance of a workload on the relevant compute node.

BRIEF SUMMARY

One embodiment of the present invention provides a method comprising obtaining component utilization data for multiple components of a compute node during at least one previous execution of a workload. The method further comprises using the component utilization data to identify a first component having a utilization level that is less than a threshold utilization level during the at least one previous execution of the workload, wherein the first component is one of the multiple components of the compute node. The method still further comprises, during a subsequent execution of the workload on the compute node, throttling the first component to prevent the first component from exceeding the threshold utilization level.

Another embodiment of the present invention provides a method comprising obtaining component utilization data for multiple components of a compute node during execution of each of a plurality of workloads. The component utilization data is used to identify a first component having a utilization level that is less than a threshold utilization level during the at least one previous execution of the workload, wherein the first component is one of the multiple components of the compute node, and wherein the plurality of workloads include first and second workloads. During a subsequent execution of the first and second workloads on the compute node, the first component may be throttled to prevent the first component from exceeding the threshold utilization level.

Yet another embodiment of the present invention provides a computer program product comprising a computer readable storage medium having non-transitory program instructions embodied therewith, the program instructions executable by a processor to cause the processor to perform a method. The method may comprise obtaining component utilization data for multiple components of a compute node during at least one previous execution of a workload; using the component utilization data to identify a first component having a utilization level that is less than a threshold utilization level during the at least one previous execution of the workload, wherein the first component is one of the multiple components of the compute node; and during a subsequent execution of the workload on the compute node, throttling the first component to prevent the first component from exceeding the threshold utilization level.

DETAILED DESCRIPTION

One embodiment of the present invention provides a method comprising obtaining component utilization data for multiple components of a compute node during at least one previous execution of a workload. The method further comprises using the component utilization data to identify a first component having a utilization level that is less than a threshold utilization level during the at least one previous execution of the workload, wherein the first component is one of the multiple components of the compute node. The method still further comprises, during a subsequent execution of the workload on the compute node, throttling the first component to prevent the first component from exceeding the threshold utilization level.

The component utilization data may be obtained or collected in various manners. In one example, the component utilization data may be collected during at least one previous execution of the workload on the same compute node where the subsequent execution of the workload is being performed. In an alternative example, the component utilization data may be collected during previous executions of the workload on another compute node having components that are equivalent to the components of the compute node where the subsequent execution of the workload is being performed. In yet another example, the component utilization data may be manually input, such as based upon an administrator's experience. In a still further example, the component utilization data may be collected during at least one previous execution of the workload on a second compute node having components that are not equivalent to the components of the compute node where the subsequent execution of the workload is being performed.

However, where the data is collected from a second compute node having components that are not equivalent to the components of the compute node, the method may further include steps to convert the component utilization data for use by the compute node. In a specific example, the method further comprises, for each of the multiple components of the compute node, determining a ratio of a performance capacity of a component on the compute node to a performance capacity of a similar type of component on the second compute node, and using the ratio and the component utilization data collected during at least one previous execution of the workload on the second compute node to determine expected component utilization levels of the multiple components of the compute node during subsequent execution of the workload on the compute node. For example, if a data storage device on a first compute node is a hard disk drive having a performance capacity of 7200 RPM with 2 MB cache, and a second compute node has a disk drive having a performance capacity of 5400 RPM with 512 KB cache, then the same workload will cause a higher utilization of the hard disk of the second compute node than the utilization of the hard disk of the first compute node. While the effect of both speed and cache size may be considered, a simple ratio based solely on speed would result in a ratio of about 7200/5400=1.33, such that a workload causing a utilization of 50% on the first compute node may be estimated to cause of utilization of 67% on the second compute node. As a second example, a given workload that causes a 4 core processor to be 40% utilized on a first compute node, may result in an expected utilization of about 30% on a second compute node having an 8 core processor, all other variables being the same.

Optionally, the component utilization data is used to determine an expected utilization level for a first component of the compute node during a subsequent execution of the workload by identifying the highest utilization level for the first component during any instance of executing the workload that is identified in the component utilization data.

The performance capacity of each of the multiple components of each node may, for example, be obtained from each node's vital product data, found in a lookup table given a node's model number, or determined through testing. In one embodiment, a performance capacity is obtained for each of the components of the compute node(s), and the component utilization data is stated as a percentage of the performance capacity for each of the components.

While a compute node may include any number of components representing a variety of component types, each compute node will typically include multiple components that perform certain essential functions of the compute node and are substantially determinative of the compute node's performance capacity. In one example, these multiple components include a processor, memory, a data storage device, and a network interface. Depending upon the nature of a given workload, one of the multiple components of a compute node may limit the performance of the workload on the compute node. Accordingly, the other components may have varying degrees of unused or "stranded" capacity during at least some period during the execution of the workload.

In another embodiment, management software may impose a utilization cap on the performance of one or more of the components of the compute node. Such a utilization cap may be a power cap imposed for the purpose of preventing a compute node or an entire network of compute nodes from exceeding a power budget or a thermal limit. A utilization cap may prevent full use of a component's capacity. For example, a utilization cap may limit a processor to a certain percentage of its maximum speed (i.e., instructions per second) or limit memory to a certain percentage of its bus speed or available memory capacity. The present embodiment recognizes that a utilization cap may affect which component will limit performance of a workload on the compute node, and may also affect the extent to which that component limits performance. In other words, with all other factors being unchanged, if the processor was already the limiting component and a utilization cap then reduces the processor speed by some percentage, then the unused capacity of the other components will increase. In another situation, a utilization cap may cause a component to limit performance of a workload even though the compute node did not previously have a component limiting performance of the workload. In one specific embodiment, the step of using the component utilization data to identify a first component having a utilization level that is less than a threshold utilization level during the at least one previous execution of the workload, may include determining, for each of the multiple components of the compute node, whether the component has a utilization cap that is greater than the utilization for that component stated in the component utilization data in association with execution of the workload.

In a further embodiment, the method may further comprise using the component utilization data to determine an expected utilization level for the first component of the compute node during the subsequent execution of the workload, wherein throttling the first component to prevent the first component from exceeding the threshold utilization level, includes throttling the second component to an extent that allows the second component to perform at an expected utilization level. In other words, the first component is throttled (i.e., its performance is limited and power consumption is reduced) to a limited extent such that the component still does not become the limiting component. Furthermore, where the expected utilization level for the first component varies during the execution of the workload, the extent of throttling the first component may be adjusted during performance of the workload. In one option, the extent of throttling the first component during execution of the workload is adjusted to maximize the extent of throttling the first component without preventing the first component from reaching the expected utilization level. In one alternative option, the extent of throttling the second component during execution of the workload is adjusted to place the second component into the lowest operating state that does not prevent the first component from reaching the expected utilization level.

Depending upon the performance capacities of the components of the compute node and the nature of the workload being executed on the compute node, any one of the multiple components may be the limiting component and any of the other components may be the first component (i.e., a non-limiting component) that is to be throttled. For example, wherein the first component is a processor, throttling the processor may include setting a performance state for the processor. Where the first component is a memory module, throttling the memory module may include reducing the clock frequency of the memory module and/or powering down the memory module or another one of multiple memory modules. Where the first component is a controller for a redundant array of independent disks, throttling the controller may include reducing the clock frequency of cache memory available to the controller. Other ways of throttling a component may also be implemented.

Another embodiment of the method further comprises obtaining a performance capacity for each of the multiple components of a plurality of compute nodes, identifying a target compute node, from among the plurality of compute nodes, having multiple components with sufficient performance capacity to perform the workload without exceeding a selected power policy, and assigning the workload to the target compute node. Accordingly, where a power policy may be enforced on a compute node, a workload may be assigned to one of the compute nodes based on a determination that the workload may be executed on the target compute node without violating the power policy.

A further embodiment of the present invention recognizes that a compute node may execute more than one workload at a time, and that the combined execution of multiple workloads will determine the limiting component and the extent to which other components may be throttled. Accordingly, one example of the method may comprise obtaining component utilization data for multiple components of a compute node during execution of each of a plurality of workloads. The component utilization data is used to identify a first component having a utilization level that is less than a threshold utilization level during the at least one previous execution of the workload, wherein the first component is one of the multiple components of the compute node, and wherein the plurality of workloads include first and second workloads. During a subsequent execution of the first and second workloads on the compute node, the first component may be throttled to prevent the first component from exceeding the threshold utilization level.

Yet another embodiment of the present invention provides a computer program product comprising a computer readable storage medium having non-transitory program instructions embodied therewith, the program instructions executable by a processor to cause the processor to perform a method. The method may comprise obtaining component utilization data for multiple components of a compute node during at least one previous execution of a workload; using the component utilization data to identify a first component having a utilization level that is less than a threshold utilization level during the at least one previous execution of the workload, wherein the first component is one of the multiple components of the compute node; and during a subsequent execution of the workload on the compute node, throttling the first component to prevent the first component from exceeding the threshold utilization level.

The foregoing computer program products may further include program instructions for implementing or initiating any one or more aspects of the methods described herein. Accordingly, a separate description of the methods will not be duplicated in the context of a computer program product.

Figure 1:
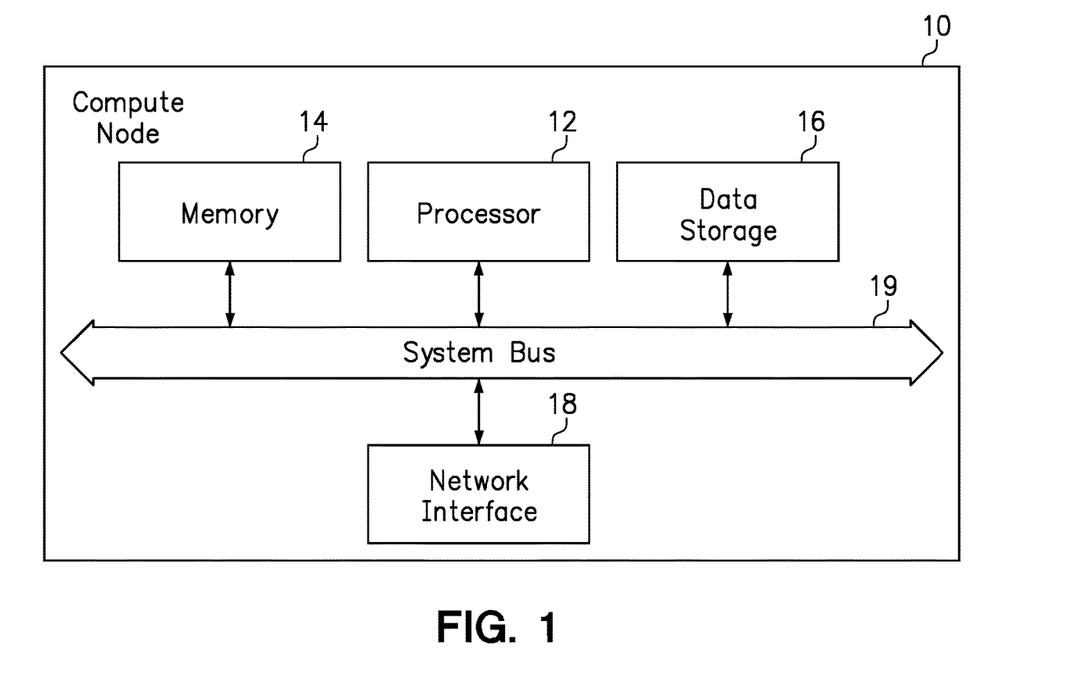
FIG. 1 is a diagram of a compute node.

FIG. 1 is a diagram of a compute node 10. The compute node 10 includes a processor 12, memory 14, a data storage device 16, a network interface 18, and a system bus 19 connecting the processor 12, memory 14, data storage device 16, and network interface 18. The illustrated compute node 10 may include other types of components and additional numbers of the components shown, and the illustrated compute node is just one non-limiting example of a compute node that may be used in accordance with one or more embodiment of the present invention.

Figure 2A:
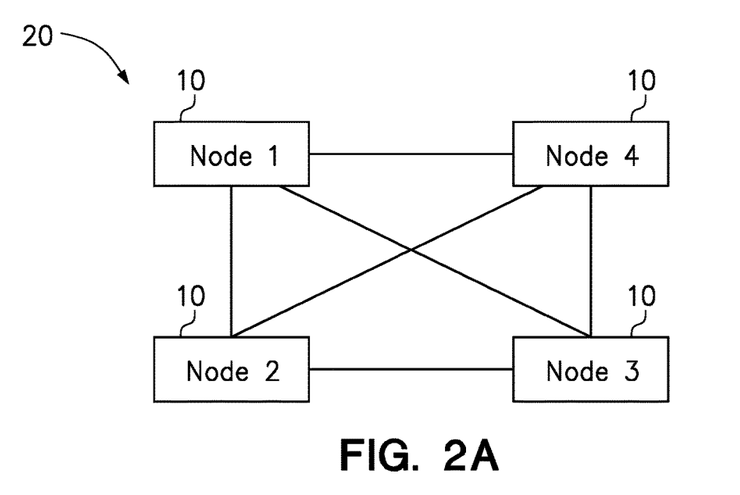
FIG. 2A is a diagram of a fully connected, peer-to-peer cluster.

FIG. 2A is a diagram of a fully connected, peer-to-peer cluster 20. In a peer-to-peer network, the compute nodes 10 (illustrated here as four nodes, Node 1 to Node 4) make resources available to other compute nodes without a central management node. Accordingly, processing power, data storage or network bandwidth may be shared among the compute nodes. The illustrated cluster is "fully connected" since each node has a direct connection to every other node in the cluster. However, the present invention is not limited to a fully connected, peer-to-peer cluster. Other network topologies may include, without limitation, a mesh, star, ring, line, or branched structure.

Figure 2B:
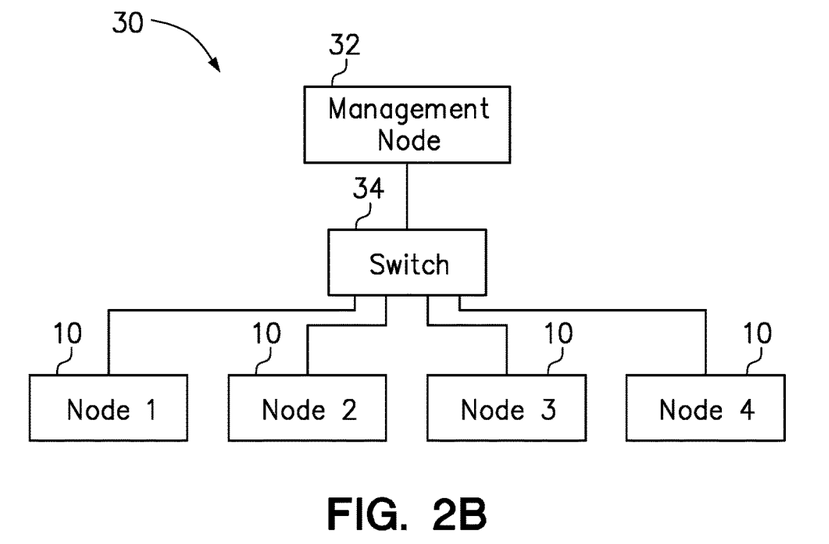
FIG. 2B is a diagram of a cluster with a central management node.

FIG. 2B is a diagram of a cluster 30 with a central management node 32. The cluster 30 includes four compute nodes 10 in communication with the central management node 32 through a switch 34. The central management node 32 may be responsible for coordinating any sharing of resources among the compute nodes 10.

Figure 3:
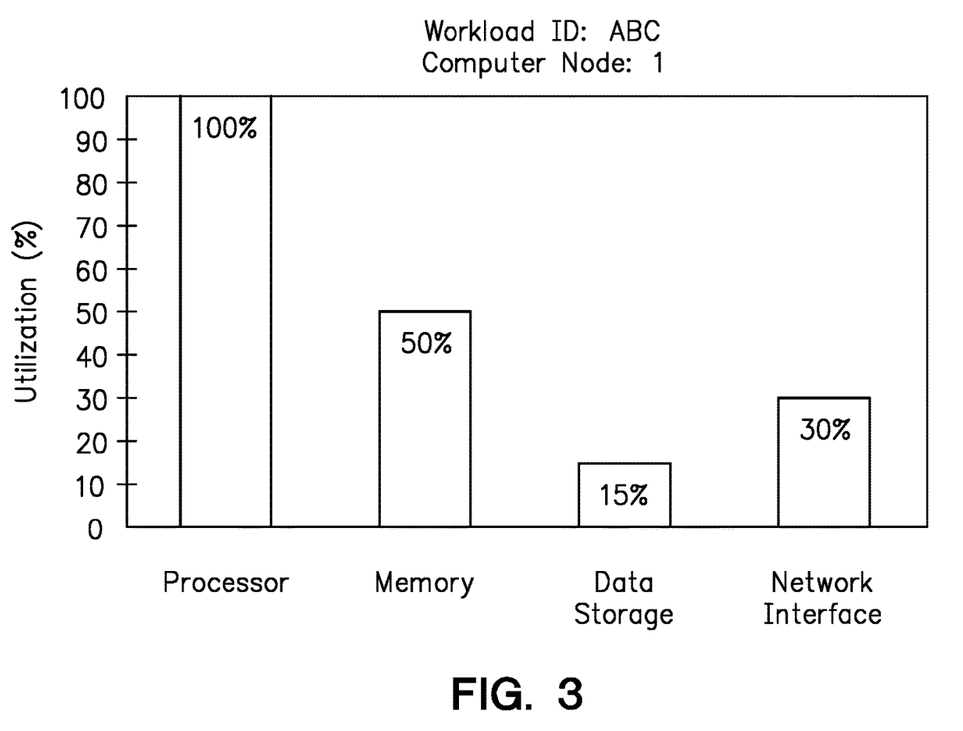
FIG. 3 is a graph of utilization for each of four components of a particular node while running a particular workload.

FIG. 3 is a graph of utilization for each of four components of a particular compute node while running a particular workload. The graph includes a vertical bar for each of a processor, memory, data storage device and network interface, where the height of the vertical bar illustrates the utilization percentage. For example, the utilization percentage may be a percentage of a component's performance capacity as stated in vital product data.

In the illustrated graph, a compute node (Compute Node 1) is executing an identified workload (Workload ABC), such that the processor is running at 100% utilization, the memory is running at 50% utilization, the data storage device is running at 15% utilization, and the network interface is running at 30% utilization. This component utilization data shows that the processor is the limiting component when Compute Node 1 executes Workload ABC, at least at the point in time represented by the graph. Accordingly, the memory, data storage device and network interface have unused capacity and steps taken to throttle one or more of these devices may result in an overall reduction in power consumption for the compute node. For example, memory running at 50% utilization is running at less than a 60% threshold of utilization. If the memory has the capability of being throttled at 60%, then this level of throttling will not prevent the memory from reaching its expected utilization of 50% while executing the workload. The available utilization thresholds available for a particular component may be limited by the throttling capabilities of the component. If a first component has multiple utilization thresholds levels (throttling levels), then the first component is preferably throttled at the lowest utilization threshold level that will not prevent the first component from performing at its expected utilization level for executing the workload.

Figure 4:
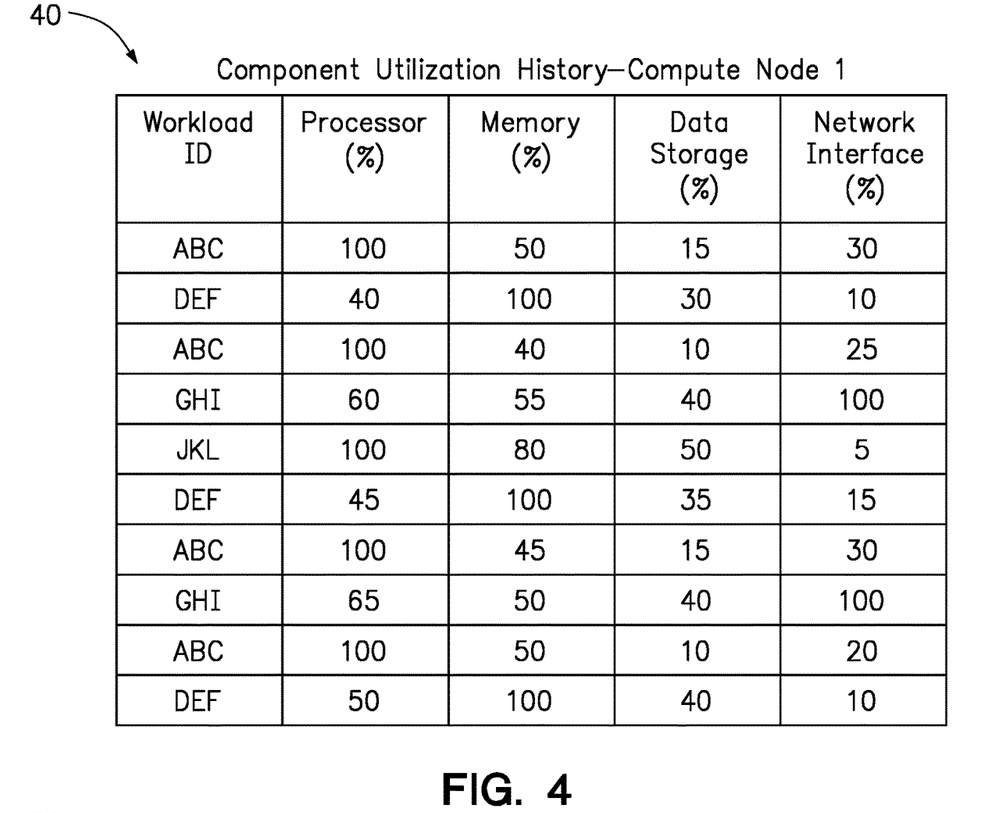
FIG. 4 is a table representing a component utilization history for a particular compute node.

FIG. 4 is a table representing a component utilization history 40 for a particular compute node (Compute Node 1). Whereas FIG. 3 provides component utilization for Compute Node 1 when executing Workload ABC, FIG. 4 provides a history of component utilization data as Compute Node 1 executes various workloads. Each row of the table identifies one instance of a workload that was executed on Compute Node 1. The first row represents that utilization data from FIG. 3. The component utilization data resulting from execution of another workload (Workload DEF) on Compute Node 1 is shown in the second row. Component utilization data for a second instance of executing Workload ABC is shown in the third row. In all, the component utilization history 40 includes four instances of executing Workload ABC.

Figure 5A:
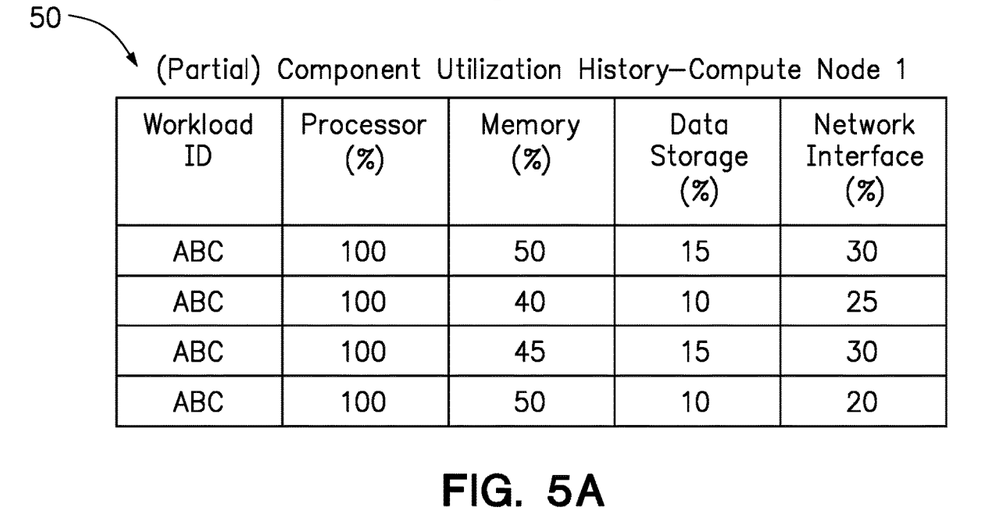
FIG. 5A is a (partial) component utilization history for a first compute node.

FIG. 5A is a (partial) component utilization history 50 for a first compute node (Compute Node 1). The history is "partial" because it only includes the four instances of executing Workload ABC. This partial component utilization history highlights that the processor is consistently the limiting component and that there is variation in the utilization of the other components.

Figure 5B:
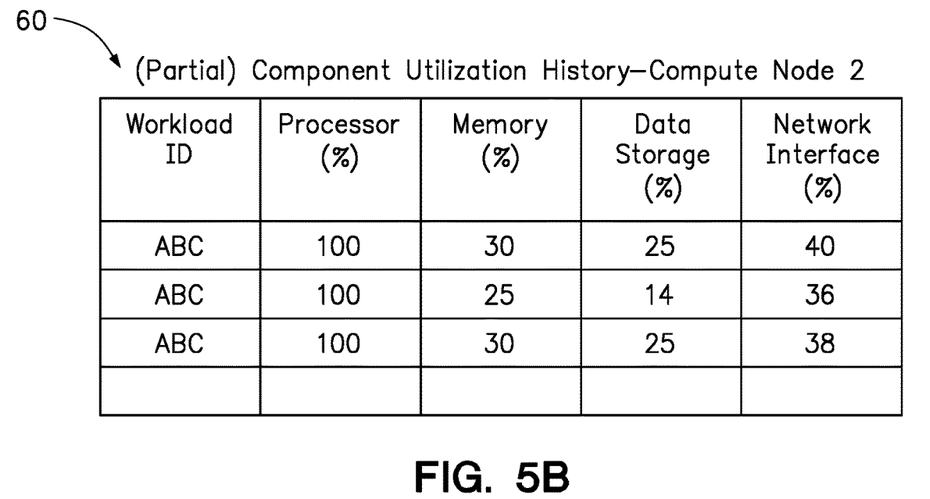
FIG. 5B is a (partial) component utilization history for a second compute node.

FIG. 5B is a (partial) component utilization history 60 for a second compute node (Compute Node 2) including three instances of executing the Workload ABC. While the processor in the second compute node is still the limiting component due to the nature of the workload, the memory utilization is lower than that for the first compute node while the data storage utilization and the network interface utilization are greater than that for the first compute node.

Figure 5C:
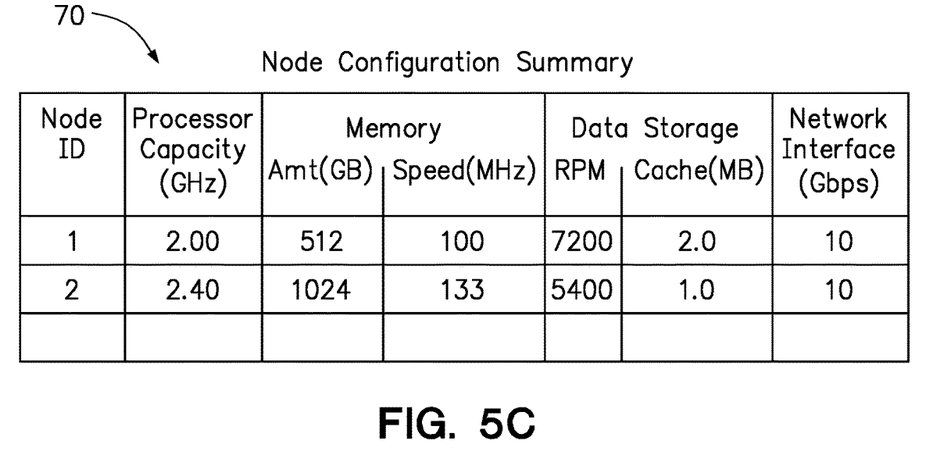
FIG. 5C is a node configuration summary including entries for both the first and second compute nodes.

FIG. 5C is a node configuration summary 70 including entries for both the first and second compute nodes (Compute Node 1 and Compute Node 2). The entry on the first row identifies the performance capacity of the processor, memory, data storage device and network interface for the first compute node (Compute Node 1), and the entry on the second row identifies the performance capacity of the processor, memory, data storage device and network interface for the second compute node (Compute Node 2). While Compute Node 2 has 20% greater processor capacity and 100% greater memory capacity, Compute Node 1 has 25% greater data storage speed. These differences in component configurations between the two compute nodes explains why, for execution of the Workload ABC, the Compute Node 2 memory utilization is lower but Compute Node 2 data storage utilization and the network interface utilization are both greater (See FIG. 5B compared to FIG. 5A). In accordance with various embodiments of the present invention, it is possible to use the component utilization history collected from one compute node and estimate an expected component utilization for another compute node that is executing the same workload using the relative performance capacities of the components in both compute nodes.

Figure 6:
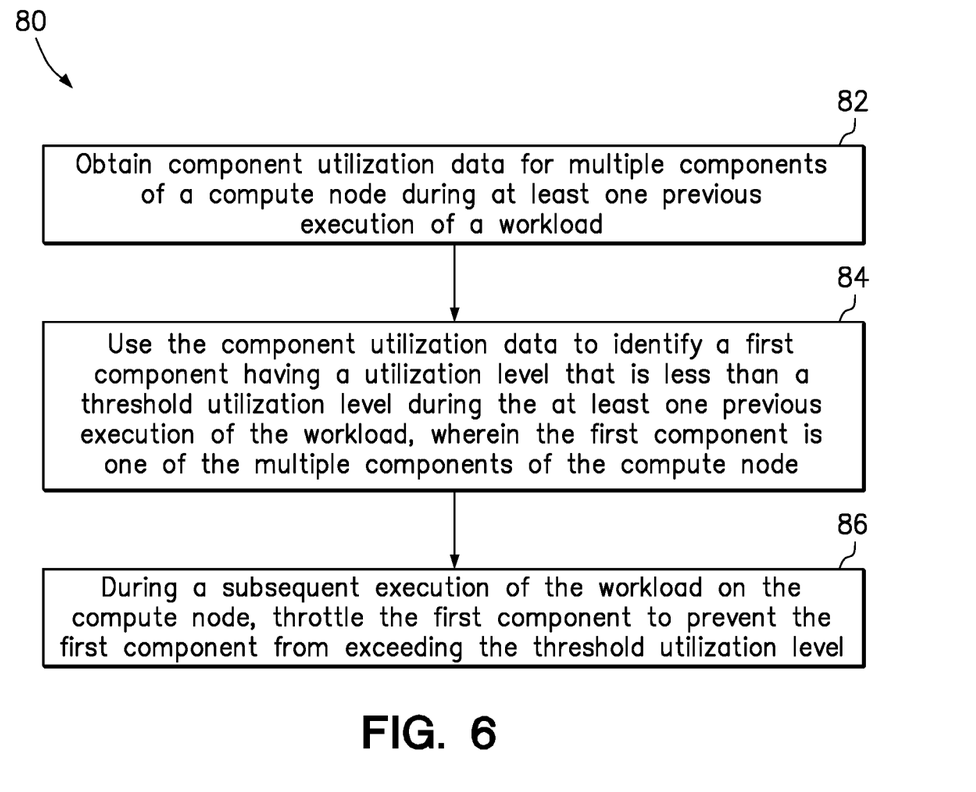
FIG. 6 is a flowchart of a method according to one embodiment of the present invention.

FIG. 6 is a flowchart of a method 80 according to one embodiment of the present invention. In step 82, the method obtains component utilization data for multiple components of a compute node during at least one previous execution of a workload. In step 84, the method uses the component utilization data to identify a first component having a utilization level that is less than a threshold utilization level during the at least one previous execution of the workload, wherein the first component is one of the multiple components of the compute node. In step 86, the method, during a subsequent execution of the workload on the compute node, throttles the first component to prevent the first component from exceeding the threshold utilization level.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a computer readable storage medium having non-transitory program instructions embodied therewith, the program instructions executable by a processor to:
   obtain component utilization data for multiple components of a compute node related to at least one previous instance of execution of a workload;
   use the component utilization data to identify a first component having a utilization level that is less than a threshold utilization level related to the at least one previous instance of execution of the workload, wherein the first component is one of the multiple components of the compute node; and
   during a subsequent instance of execution of the workload on the compute node, throttle the first component to prevent the first component from exceeding the threshold utilization level, wherein the first component is throttled by placing the first component into the lowest operating state that does not prevent the first component from reaching an expected utilization level.

2. The computer program product of claim 1, wherein the component utilization data includes component utilization data collected during at least one previous instance of execution of the workload on the same compute node where the subsequent instance of execution of the workload is being performed.

3. The computer program product of claim 1, wherein the component utilization data includes component utilization data collected during at least one previous instance of execution of the workload on another compute node having components that are equivalent to the components of the compute node where the subsequent instance of execution of the workload is being performed.

4. The computer program product of claim 1, wherein the program instructions executable by a processor to use the component utilization data to identify a first component having a utilization level that is less than a threshold utilization level during the at least one previous instance of execution of the workload, include program instructions executable by a processor to determine, for each of the multiple components of the compute node, whether the component has a utilization cap that is greater than the utilization for that component stated in the component utilization data in association with execution of the workload.

5. The computer program product of claim 1, wherein the program instructions are executable by a processor to:
   obtain a performance capacity for each of the components of the compute node, wherein the component utilization data is stated as a percentage of performance capacity for each of the components.

6. The computer program product of claim 1, wherein the program instructions are executable by a processor to:
   use the component utilization data to determine the expected utilization level for the first component of the compute node during the subsequent instance of execution of the workload, wherein the program instructions executable by a processor to throttle the first component to prevent the first component from exceeding the threshold utilization level, include program instructions executable by a processor to throttle a second component to an extent that allows the second component to perform at an expected utilization level for the second component.

7. The computer program product of claim 6, wherein the expected utilization level for the first component varies during the execution of the workload, wherein the program instructions are executable by a processor to:
adjust the extent of throttling the first component during performance of the workload.

8. The computer program product of claim 7, wherein the program instructions executable by a processor to adjust the extent of throttling the first component during execution of the workload, includes program instructions executable by a processor to maximize the extent of throttling the first component without preventing the first component from reaching the expected utilization level.

9. The computer program product of claim 6, wherein the program instructions executable by a processor to use the component utilization data to determine an expected utilization level for the first component of the compute node during the subsequent instance of execution of the workload, includes program instructions executable by a processor to identify the highest utilization level for the first component during any instance of executing the workload among a plurality of instances of executing the workload that is identified in the component utilization data.

10. The computer program product of claim 1, wherein the first component is a processor, and wherein throttling the processor includes setting a performance state for the processor.

11. The computer program product of claim 1, wherein the first component is a memory module, and wherein the program instructions executable by a processor to throttle the memory module includes program instructions executable by a processor to reduce the clock frequency of the memory module.

12. The computer program product of claim 1, wherein the first component is a memory module among a plurality of memory modules, and wherein the program instructions executable by a processor to throttle the memory module includes program instructions executable by a processor to power down the memory module.

13. The computer program product of claim 1, wherein the first component is a controller for a redundant array of independent disks, and wherein the program instructions executable by a processor to throttle the controller includes program instructions executable by a processor to reduce the clock frequency of cache memory available to the controller.

14. The computer program product of claim 1, wherein the component utilization data includes component utilization data collected during at least one previous instance of execution of the workload on a second compute node having components that are not equivalent to the components of the compute node where the subsequent instance of execution of the workload is being performed.

15. The computer program product of claim 14, wherein the program instructions are executable by a processor to:
for each of the multiple components of the compute node, determine a ratio of a performance capacity of a component on the compute node to a performance capacity of a similar type of component on the second compute node; and
use the ratio and the component utilization data collected during at least one previous instance of execution of the workload on the second compute node to determine expected component utilization levels of the multiple components of the compute node during the subsequent instance of execution of the workload on the compute node.

16. The computer program product of claim 1, wherein the program instructions are executable by a processor to:
obtain a performance capacity for each of the multiple components of a plurality of compute nodes;
identify a target compute node, from among the plurality of compute nodes, having multiple components with sufficient performance capacity to perform the workload without exceeding a selected power policy; and
assign the workload to the target compute node.

17. A computer program product comprising a computer readable storage medium having non-transitory program instructions embodied therewith, the program instructions executable by a processor to:
obtain component utilization data for multiple components of a compute node related to an instance of execution of first and second workloads;
use the component utilization data to identify a first component having a utilization level that is less than a threshold utilization level related to the instance of execution of the first and second workloads, wherein the first component is one of the multiple components of the compute node; and
during a subsequent instance of execution of the first and second workloads on the compute node, throttle the first component to prevent the first component from exceeding the threshold utilization level, wherein the first component is throttled by placing the first component into the lowest operating state that does not prevent the first component from reaching an expected utilization level.

18. The computer program product of claim 17, wherein the component utilization data includes component utilization data collected during at least one previous instance of execution of the workload on the same compute node where the subsequent instance of execution of the workload is being performed.

* * * * *